Jan. 3, 1961 D. CLEGG 2,966,800
SAMPLER DEVICE
Filed July 26, 1957 2 Sheets-Sheet 1
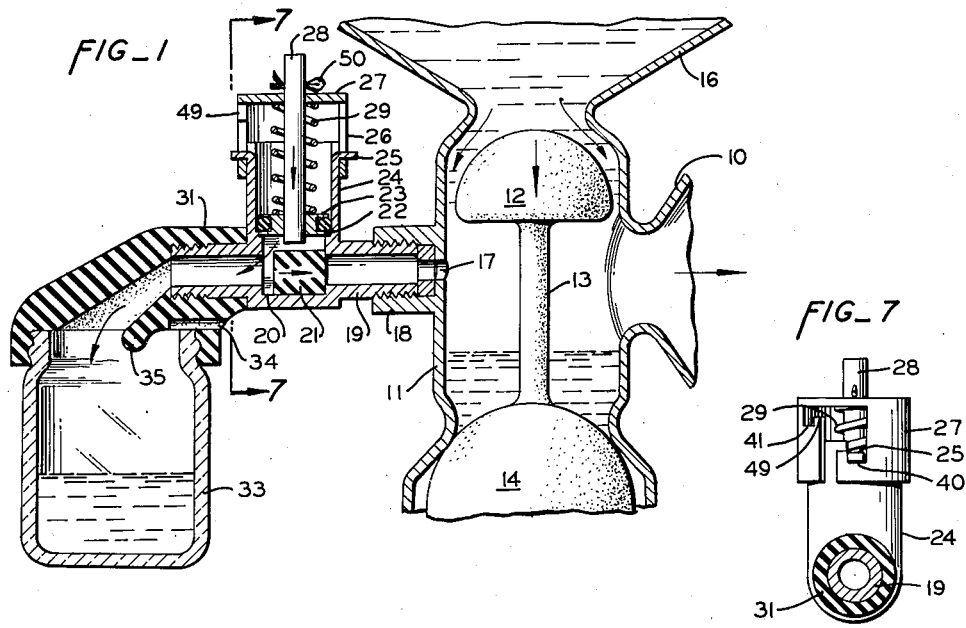
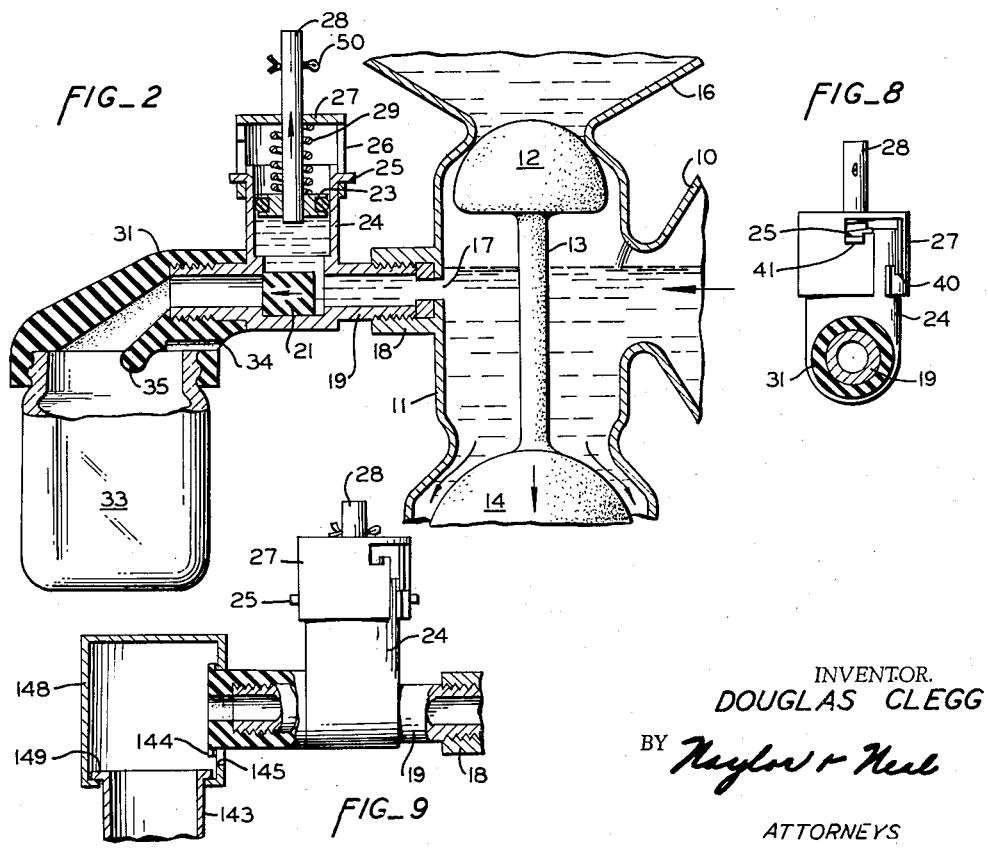
INVENTOR.
DOUGLAS CLEGG
BY *Naylor + Neal*
ATTORNEYS Jan. 3, 1961 D. CLEGG 2,966,800
SAMPLER DEVICE
Filed July 26, 1957 2 Sheets-Sheet 2
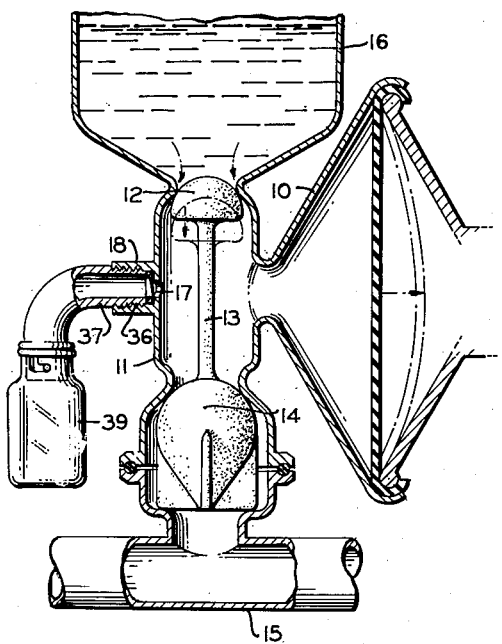
FIG_3
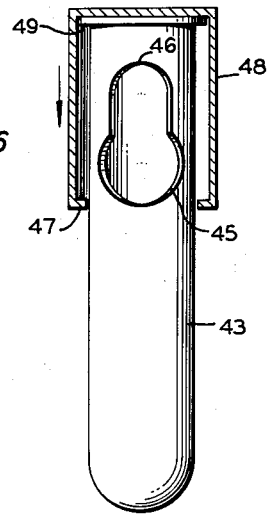
FIG_6
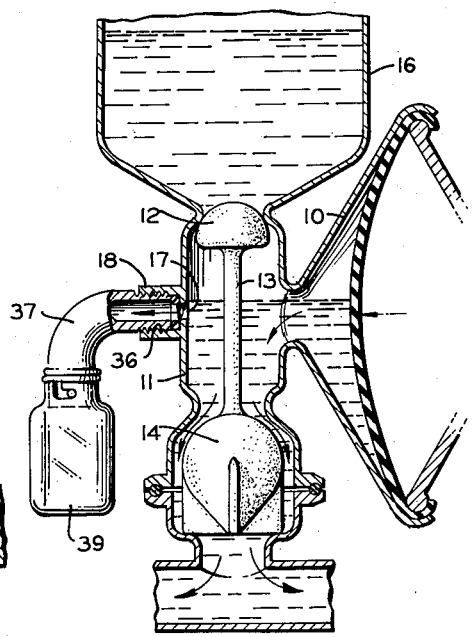
FIG_4
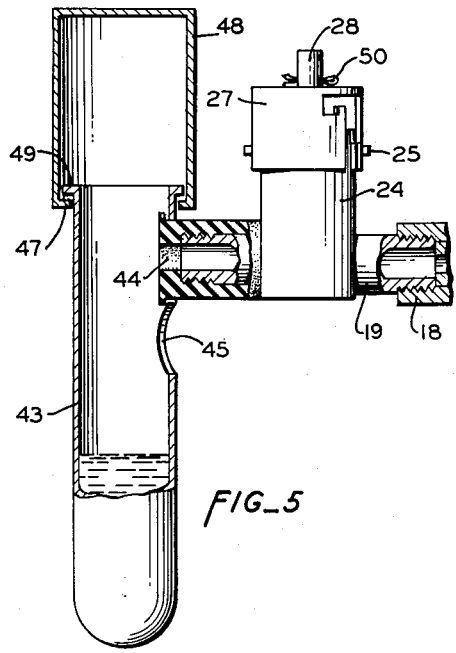
FIG_5
INVENTOR.
DOUGLAS CLEGG
BY Naylor & Neal
ATTORNEYS

# United States Patent Office 2,966,800
Patented Jan. 3, 1961

2,966,800
SAMPLER DEVICE

Douglas Clegg, Kellogg, Calif.
(Rte. 1, Box 52, Calistoga, Calif.)

Filed July 26, 1957, Ser. No. 674,493

8 Claims. (Cl. 73—422)

This invention relates to the milking art, and more particularly to means in a multi-stanchion milker system for obtaining a representative sample for test purposes of the milk obtained from each cow.

This application is a continuation-in-part of a co-pending application, Serial No. 550,917, filed December 5, 1955, now Patent No. 2,886,000.

The said co-pending application discloses a pipeline milker system which comprises, among other features, a separate reciprocating pump for each of the cows to be milked for the purpose of pumping the milk from the individual vacuum-releasers into a common transport line.

In the present application, we shall be more particularly concerned with these pumps, the chambers with which they communicate, and the sampling devices directly attached thereto.

An object of the present invention is to allow the milk of each cow to be separately and automatically sampled for the purpose of obtaining valuable information about the milk and the milking characteristics of the particular animal.

A further object of this invention is to withdraw a representative sample which might be assumed to be truly indicative of the average composition of all the milk yielded by a cow during the entire milking process.

A further object of the invention is to perform the sampling under conditions of least contamination from outside impurities.

These and further objects and advantages of the invention will become more readily apparent from the reading of the specification when examined in connection with the accompanying sheets of drawings.

Figure 1 is a cross-sectional view of a preferred sampling device, the chamber with which it communicates, and part of the pump which propels the milk.

Figure 2 is the same view as Figure 1, and shows the system during the pressure stroke of the pump.

Figures 3 and 4 show a variation of this sampling device.

Figures 5 and 6 represent a variation of the sampling device shown in Figure 1.

Figure 7 shows a detail of the sampling device of Figure 2.

Figure 8 shows the same detail as Figure 4 with some of its component parts in a different position.

Figure 9 is a view similar to that of Figure 5, but showing a modified form of the sampling device of the latter figure.

Referring to the drawings in detail, diaphragm pump 10, the details of which are shown in the above-mentioned copending application, communicates with chamber 11 which is closed by the two valves 12 and 14. These are linked by the flexible connection 13. A lateral opening 17 allows communication between chamber 11 and duct 19, this duct having its end threaded so as to be attachable about opening 17 by means of the threaded extension 18. The other end of duct 19 is threadably engaged with attachment 31, said attachment being itself threadably engaged with receptacle 33. A slide valve 21 is movable in its duct bed 20 under the impulse of pump 10 so as to alternately close off duct 19 toward chamber 11 and toward receptacle 33, depending on whether the pump is in suction or pressure. Piston 23, located in cylinder 24, is adapted to rest on ledge 22, being pressed against this ledge by spring 29 which is inserted between the top 27 of cap 26 and piston 23, and which surrounds rod 28 to which piston 23 is secured. Cap 26 is fastened to cylinder 24 by outwardly bent ears 25 formed in the cylinder which are selectively fittable within pairs of opposed notches 40 and 41 forming part of opposed double bayonet slots, including entranceways 49 for the ears 25, formed in cap 26. The cap is prevented from falling by spring 29 which is always under a slight tension.

Port 34 in attachment 31 allows the air in receptacle 33 to be displaced therefrom by the incoming milk. Pin 50 merely serves to guard against the cap 26 being catapulted into the air when the cap is being adjusted or removed from the cylinder. Baffle 35 serves to avoid the plugging of port 34 due to splashing of the incoming milk and to prevent the loss of milk through said port.

When the suction stroke of pump 10 occurs, valve 12 opens and milk from vacuum releaser 16 flows into the pump and chamber 11. At the start of the pressure stroke, valve 12 is closed and valve 14 opens to let the milk into line 15. At the same time, the milk pushes slide valve 21 back, enters the cylinder 24 and pushes piston 23 as far up as spring 29 will allow it. As a consequence, some milk is stored in the cylinder between each pressure and suction stroke. When the latter occurs, slide valve 21 slides back, closing off communication between cylinder 24 and chamber 11 and letting the milk flow down into receptacle 33 as spring 29 forces piston 23 downwardly. This operation is repeated with every pressure-suction stroke cycle of the pump.

Figures 3 and 4 shows a variation of the sampling device described above. Duct 37 has one of its ends 36 threaded so as to be attachable about opening 17 by means of the threaded extension 18. The other end of the duct extends through and is in sealed relation with the top of receptacle 39.

During the pressure stroke, milk is forced into duct 37 but encounters the resistance of the entrapped air which has no other means of escape than opening 17. The net amount of milk which flows through duct 37 with each pressure stroke is therefore small. The entrapped air, some of which is lost with each suction stroke, serves as an air cushion, causing some of the milk within the receptacle to return to chamber 11 during the suction stroke of the pump, and thereby preventing the quick filling up of the receptacle and enabling a substantially representative overall sample of milk to be obtained.

Figures 5 and 6 show a variation of the receptacle portion of the sampling device of Figure 1. Instead of being threaded the outer end of the duct is provided with a flange 44, which flange can be introduced into opening portion 45 of container 43. Opening portion 45 communicates with a smaller opening portion 46. By sliding the end of the duct into opening portion 46, the container is fastened in an upright position, and opening portion 45 then serves as the vent to atmosphere.

Container 43, which is in the shape of a test tube for subsequent convenient handling and testing of its contents, has a flange 49 at its open end. Cap 48 of the container also has a flange 47 inwardly directed and adapted to engage the flange of the container when the cap is drawn up as far as possible. The rim of the cap is further in contact at all times with the cylindrical body of the container. When container 43 is removed with the sample, cover 48 is pushed down and made to cover the opening in the container. Both cap and container should be manufactured of such resilient material as will allow the cap to be pried off the container when the milk is to be tested or poured out. It should further be mentioned that container 43 can be used as the testing receptacle and can bear graduations if desired.

In the Figure 9 modification of the Figure 5 sampling device, the duct opening 145, which is circular in form and just slightly over-sized with respect to duct flange 144, is formed in the cap 148 rather than in tube 143. When the sample has been obtained and the sampler has been removed from the duct, cap 148 is moved downwardly to bring tube flange 149 above cap opening 145, thereby sealing the contents of the tube.

Figures 7 and 8 show the cylinder 24 and cap 27 in different positions of engagement, ears 25 being placed in notches 40 in the case of Figure 7 and in notches 41 in the case of Figure 8. It is apparent from these two views that piston 23 may move a lesser distance in the case of Figure 8 than in the case of Figure 7 and that less milk will be withdrawn at each pressure stroke of the pump. The setting depicted in Figure 8 will therefore be used whenever the cow being milked yields large amounts and the setting of Figure 7 will be used for cows giving less milk. A minimum total sample of approximately 15 cc. is required for test purposes. As disclosed in the aforementioned application, pump 10 is preferably conditioned to pump a given volume or weight (e.g., 1 lb). of milk during each stroke cycle. Some cows may yield as little as 5 lbs. of milk per milking, others as high as 45 lbs. Under these conditions, the pump would make in the one instance 5 strokes and in the other 45 strokes. This calls for the different sample volume per stroke settings of Figures 7 and 8 in order to obtain the minimum total sample required and to obtain an overall representative sampling of the entire yield, without getting too large a sample from heavy producers.

What is claimed is:

1. In a pipeline milker system embodying reciprocating pump means located adjacent a milking stanchion and adapted to act upon the milk of an individual cow and cause the same to be delivered into a transport line, and a valve-controlled chamber in communication with said pump means adapted to be filled with milk during the suction stroke of the pump means and to be substantially emptied of milk during the pressure stroke of the pump means, the combination therewith of means for sampling the milk being pumped from a chamber, said sampling means comprising conduit means, a sampler receptacle, one end of said conduit means communicating with said chamber and the other end communicating with said receptacle, means defining a container communicating with said conduit means intermediate the ends thereof, and a valve element movably disposed in said conduit means operable under the action of a pressure stroke of said pump means to provide for communication between said chamber and container and to interrupt communication between said container and said receptacle and operable under the action of a suction stroke of said pump means to interrupt communication between said chamber and container and provide for communication between said container and receptacle.

2. The combination of claim 1, said sampler receptacle being removably secured to said conduit means, and vent means providing communication between said sampler receptacle and atmosphere when said receptacle is secured to said conduit means.

3. In a pipeline milker system embodying reciprocating pump means located adjacent a milking stanchion and adapted to act upon the milk of an individual cow and cause the same to be delivered into a transport line, and a valve-controlled chamber in communication with said pump means adapted to be filled with milk during the suction stroke of the pump means and to be substantially emptied of milk during the pressure stroke of the pump means, the combination therewith of means for sampling the milk being pumped from a chamber, said sampling means comprising conduit means disposed in communication with said chamber, valve means associated with said conduit means operable to permit the flow therepast of sample portions of milk and to prevent the flow therepast of atmospheric air, a sampler receptacle removably secured to said conduit means at the opposite side of said valve means with respect to said chamber, vent means providing communication between said sampler receptacle and atmosphere when said receptacle is secured to said conduit means, and means defining a sample receiving chamber, said latter chamber being in communication with said conduit means at a location intermediate said valve-controlled chamber and said receptacle, said valve means being slidably disposed in said conduit means, being operable in response to a suction stroke of said pump means to move a first position to interrupt communication along said conduit means between said valve-controlled chamber and said sample receiving chamber and to bring said latter chamber into communication along said conduit means with said receptacle, and being operable in response to a pressure stroke of said pump means to move to a second position to interrupt communication between said sample receiving chamber and said receptacle and to bring said valve-controlled chamber into communication with said sample receiving chamber.

4. The combination of claim 3 including a spring loaded piston mounted for reciprocal movement within said sample receiving chamber adapted to be yieldingly moved away from said conduit means to admit milk into said chamber when said valve means is in said second position and adapted to discharge said milk into said receptacle when said valve means is in said first position.

5. The combination of claim 4 including means for adjustably controlling the distance said piston can be moved within said chamber to thereby control the amount of milk delivered to said receptacle for a suction-pressure stroke cycle of operation of said pump means.

6. In combination with a reciprocating pump acting directly on the fluid within a chamber which is normally closed by one-way yieldingly movable valve elements, a sampling device comprising a conduit having one end in communication with said chamber, a sampler receptacle removably connected to the other end of said conduit, and means for withdrawing substantially equal samples of fluid from said chamber into said receptacle for each suction-pressure stroke cycle of said pump, said means comprising a cylinder connected to said conduit, a plug valve constrained for limited sliding movement in said conduit operable during a pressure stroke of said pump to bring said chamber into communication with said cylinder through said conduit and admit pressurized fluid into said cylinder, and a spring-loaded piston in said cylinder adapted to be moved a predetermined degree by said pressurized fluid, said plug valve being operable during a suction stroke of said pump to interrupt communication between said chamber and cylinder and bring said cylinder into communication with said receptacle through said conduit to permit said spring-loaded piston to discharge the fluid within said cylinder into said receptacle, and means providing for the continuous venting of said receptacle to atmosphere.

7. In combination, in a milker system, means defining a chamber, first and second yieldingly movable valve elements in control relation, respectively, to the inlet and outlet ends thereof, a reciprocating pump in communication with said chamber adapted during a suction stroke to cause said first valve element to open and induce milk into said chamber and adapted during a pressure stroke to cause said first valve element to close and said second valve element to open to thereby force milk out of said chamber, a milk sampler receptacle, a conduit interconnecting said receptacle and chamber, means defining a container in communication with said conduit intermediate said chamber and receptacle, and flow control means within said conduit operable in response to a pressure stroke of said pump to cause a flow of milk through said conduit into said container and operable in response to a suction stroke of said pump to enable a flow of milk from said container to said receptacle, said container having a lesser volume than said receptacle.

8. In a pipeline milker system comprising a reciprocating pump, first normally closed conduit means interconnecting said pump and a milker claw adapted to be affixed to a cow, said conduit means being adapted to be opened under the influence of a suction stroke of said pump to admit milk to said pump, second normally closed conduit means interconnecting said pump and a milk transport line, said conduit means being adapted to be opened under the influence of a pressure stroke of said pump to admit milk to said transport line, a sampler conduit having the inlet end thereof in communication with said second normally closed conduit means and having the outlet end thereof provided with a fitting to which a sampler receptacle may be removably attached, and milk transfer means to receive a quantity of milk from said normally closed conduit means, momentarily hold the same, and then transmit it to the outlet end of said sampler conduit comprising bypass container means communicating with said conduit between the ends thereof and pressure responsive valve means movably disposed within said conduit operable under the influence of a pressure condition at the inlet end of said conduit to interconnect said bypass container means with the inlet end of said conduit and under a suction condition in the inlet end of said conduit to interconnect said bypass container with the outlet end of said conduit.

References Cited in the file of this patent
UNITED STATES PATENTS

| | | |
|---|---|---|
| 1,295,511 | Jernberg | Feb. 25, 1919 |
| 2,116,265 | Hejduk et al. | May 3, 1938 |
| 2,233,818 | Matter | Mar. 4, 1941 |
| 2,548,193 | Blum | Apr. 10, 1951 |
| 2,588,461 | Atterling et al. | Mar. 11, 1952 |
| 2,641,934 | Werts | June 16, 1953 |

OTHER REFERENCES

Continuous Automatic Sampling, 1, P. L. De Verter et al., Oil and Gas Journal, April 2, 1956, vol. 54, No. 48 (pages 124 to 131, page 124, 125 pertinent).